March 3, 1970  W. D. HUGHES  3,498,320
PRESSURE LIQUID LEVEL INDICATOR

Filed July 3, 1967  3 Sheets-Sheet 1

INVENTOR
WALTER D. HUGHES
BY P.E. Johnston
Harold D. Messner
ATTORNEYS

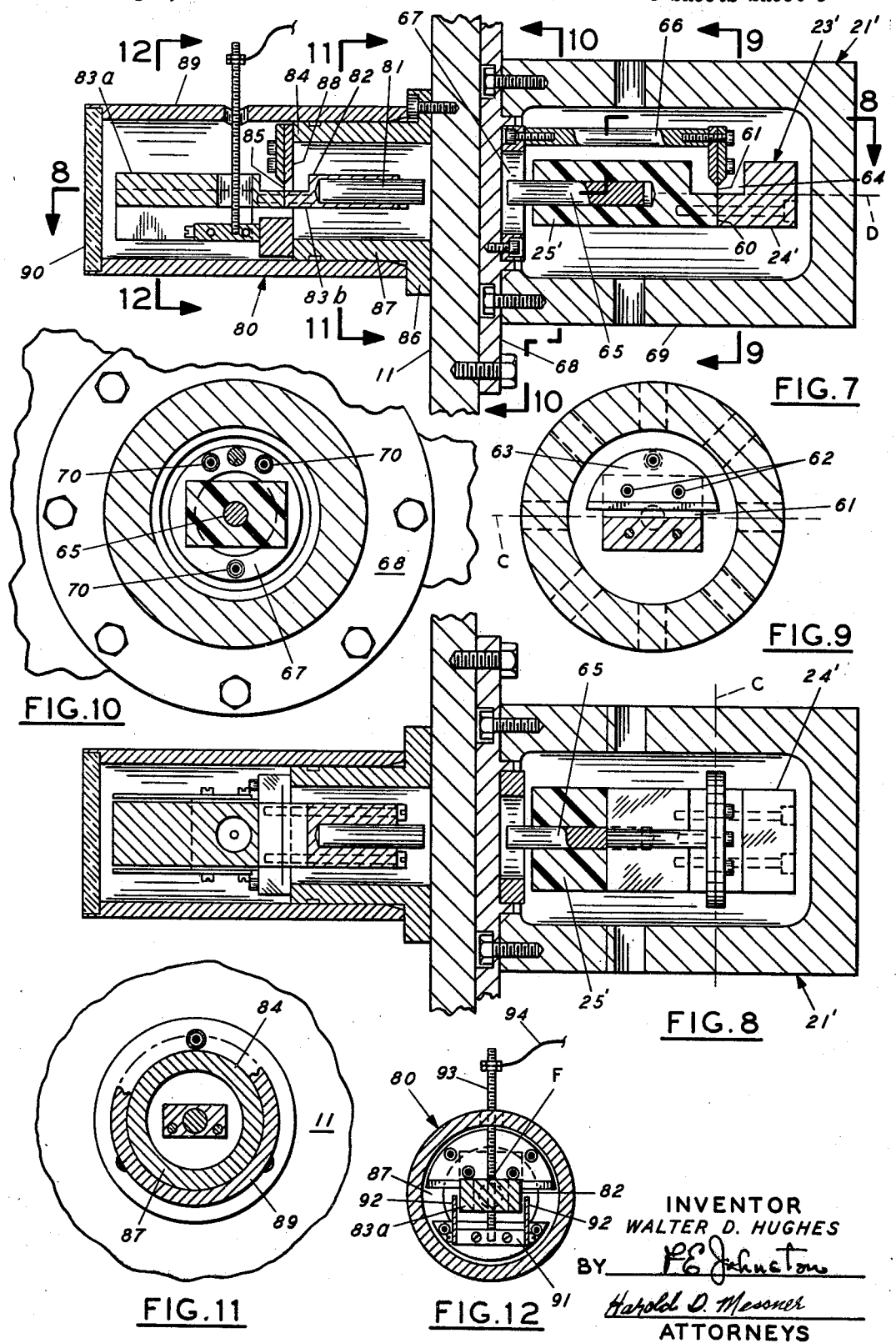

United States Patent Office 3,498,320
Patented Mar. 3, 1970

3,498,320
PRESSURE LIQUID LEVEL INDICATOR
Walter D. Hughes, Richmond, Calif., assignor to Chevron Research Company, San Francisco, Calif., a corporation of Delaware
Filed July 3, 1967, Ser. No. 650,745
Int. Cl. F16k *31/12;* G01f *23/22;* G05d *9/00*
U.S. Cl. 137—412
13 Claims

ABSTRACT OF THE DISCLOSURE

A sensor member for use in a liquid level control system for maintaining a predetermined liquid level within a vessel composed of at least two elements formed of materials of different specific gravities adapted to angularly rotate in response to deviations of the controlled liquid relative to an established elevational set-point level coincident with the location of the sensor member.

---

This invention relates, in general to liquid level systems utilizing a liquid level control valve for maintaining a predetermined liquid level within a vessel. More particularly, it relates to a liquid level indicator-controller for use in a liquid level control system that:

(1) Senses a desired liquid control level within the vessel by monitoring the variation in angular position of a non-floatable angularly rotational sensing member located within the vessel at the desired monitoring depth, and (2) Communicates the monitored variation in angular position of the sensor to a display and control circuit by imparting movement to a magnetically coupled follower exterior of the vessel by reason of spacially changing magnetic lines of force established by a magnet attached to the sensor. The follower may also be associated with an air signal generator for automatically controlling valve means attached to the vessel so as to maintain the level of the liquid within a predetermined range.

In accordance with the invention, the sensor member is composed of at least two elements formed of materials of different specific gravities. These elements are adapted to angularly rotate (in either a clockwise or counterclockwise direction) in response to the deviations of the controlled liquid relative to an established elevational set-point level coincident with the location of the sensor member. In accordance with one aspect of the invention, the elements constituting the sensor are coextensive in length having mating surfaces substantially parallel to the surface of the liquid to be monitored. The ends of the elements are provided with pivot pins, say jewelled watch pivots, rotatably fixed in a horizontal plane to a nonmagnetic housing secured to the wall of the vessel. The housing has large openings to allow fluid exterior of the housing to enter and contact the sensor. When the level of the liquid is coincident with the established set-point level, static loads acting on the sensor (both gravitational and fluid) become equalized about the pivot axis thereby establishing a nonrotational condition. As the liquid level falls below the set-point level, rotation occurs in a first angular direction, say counterclockwise, relative to the pivot axis. However, when the level is above the set-point level, angular rotation is in an opposed direction. The extent of rotation is a function of the magnitude of the differential buoyant force acting on the sensor and the distance of the line of action of the buoyant force relative to the pivot axis. The rotation ceases as the forces acting on the sensor again become equalized with respect to the pivot axis.

In accordance with another aspect of the invention, the two elements constituting the sensor member may be placed end-to-end so that their contacting end surfaces are vertically aligned but whose axes of symmetry are coincident and parallel to the surface of the liquid to be monitored. Between the ends of the elements is secured a thin, flexible strip of metallic foil. The metallic strip has an upper extension affixed to a cantilevered support arm which, in turn, is affixed to a non-metallic housing secured to the side wall of the vessel. Each element is adapted, by size and material selection, to provide angular rotation in response to the deviation of the liquid relative to the set-point level of the system as previously described. The set-point level of the system is parallel to the surface of the liquid to be monitored and intersects the horizontally extending pivot axis where the metallic strip contacts the two elements constituting the sensor.

In accordance with still another aspect of the present invention, the angular rotation of the sensor is detected by a magnetic follower exterior of the vessel. Since the sensor interior of the vessel is provided with at least a single magnet, rotation thereof can be monitored exterior of the vessel by a similarly arranged magnetic system by reason of the fact that the vessel is nonmagnetic and the spatially changing magnetic lines of force therefore pass through the walls of the vessel to cause corresponding rotation of the follower. Elements of the control circuit associated with the follower utilize the degree of rotation of the follower to control the liquid level within the vessel, as previously described.

Heretofore, engineers skilled in process design and control have utilized control valves in combination with a flotation sensor to maintain predetermined liquid levels within process vessels. Usually, these control valves are employed at the inlets or outlets of the vessels and vary the flow rate of the controlled fluid in accordance with deviations of the sensor from a predetermined set-point level. Associated with the flotation sensor is a follower system external of the vessel for actuating the control valve as the flotation sensor deviates from the set-point level. One problem associated with a flotation sensing control system has been found to be the maintenance of system efficiency in many of today's refinery processes. This is especially difficult where control must occur in high-temperature, high-pressure processes employing highly caustic fluids. For example, where the vessel pressure is rather high, say 5,000 p.s.i., flotation sensors formed of high-porosity, lightweight materials may become "heavy" as they absorb a portion of the liquid to be monitored. The result is an inability of the sensor to change in elevation as the liquid level varies.

In accordance with the present invention, liquid within a process vessel is maintained at a predetermined level by monitoring the variation in liquid level above or below a predetermined set-point level by means of a nonfloatable noncorrosive sensor located within a housing member fixedly attached to the side wall of the vessel at the level at which the liquid is to be maintained. The sensing element includes a pair of coextensive sensing elements of relatively impervious materials adapted to angularly rotate in response to deviations of the monitored liquid from a set-point elevational level.

Further objects and features of the invention will be readily apparent to those skilled in the art from the specification and appended drawings illustrating a preferred embodiment wherein.

Figure 2:
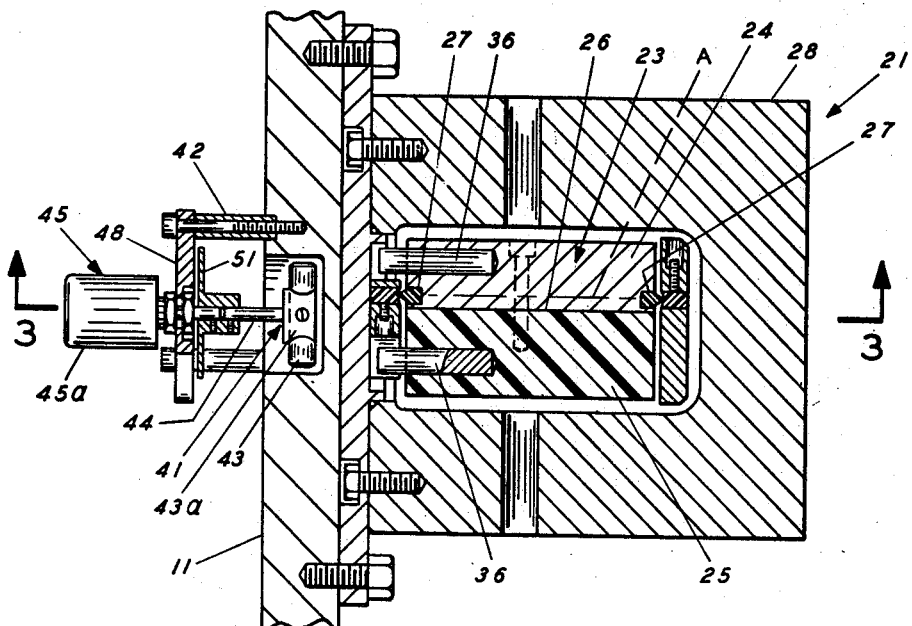
FIGURE 2 is a section taken along line 2—2 of FIGURE 1 illustrating, in detail, elements of the liquid level control system of FIGURE 1.
Figure 1:
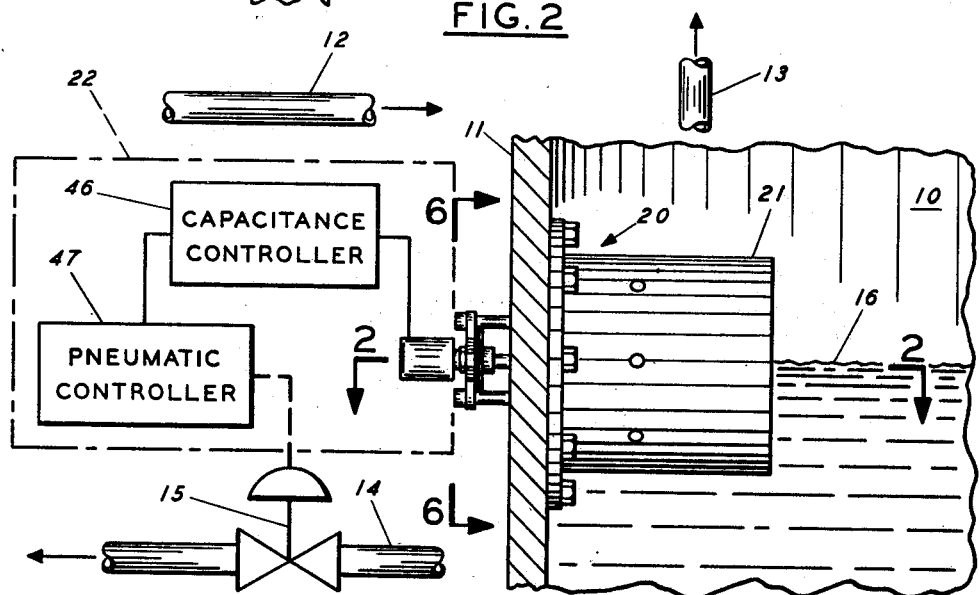
FIGURE 1 is an elevational view in partial section illustrating the liquid level control system of the present invention.
Figure 6:
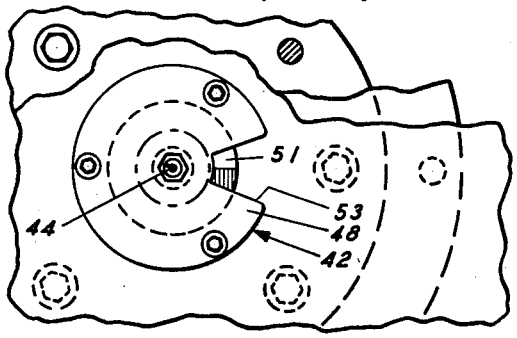
Figure 4:
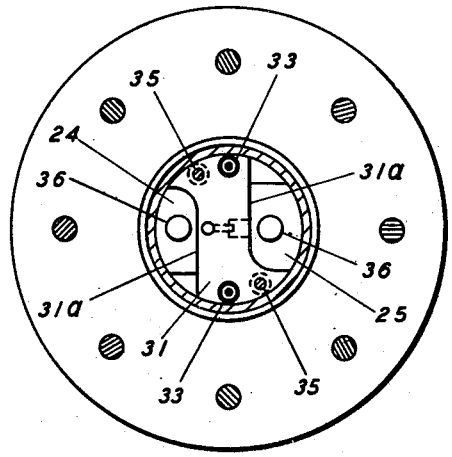
Figure 5:
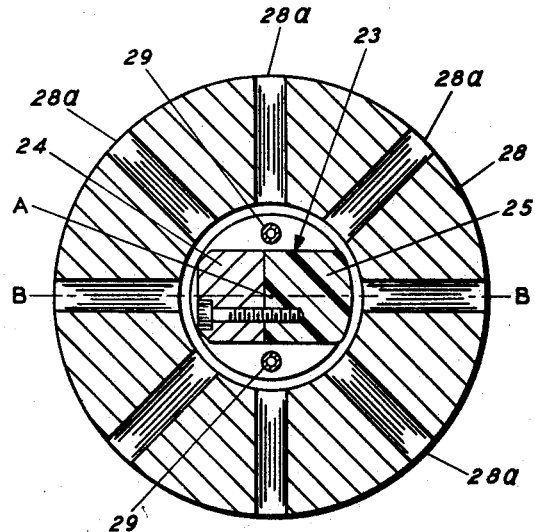
Figure 3:
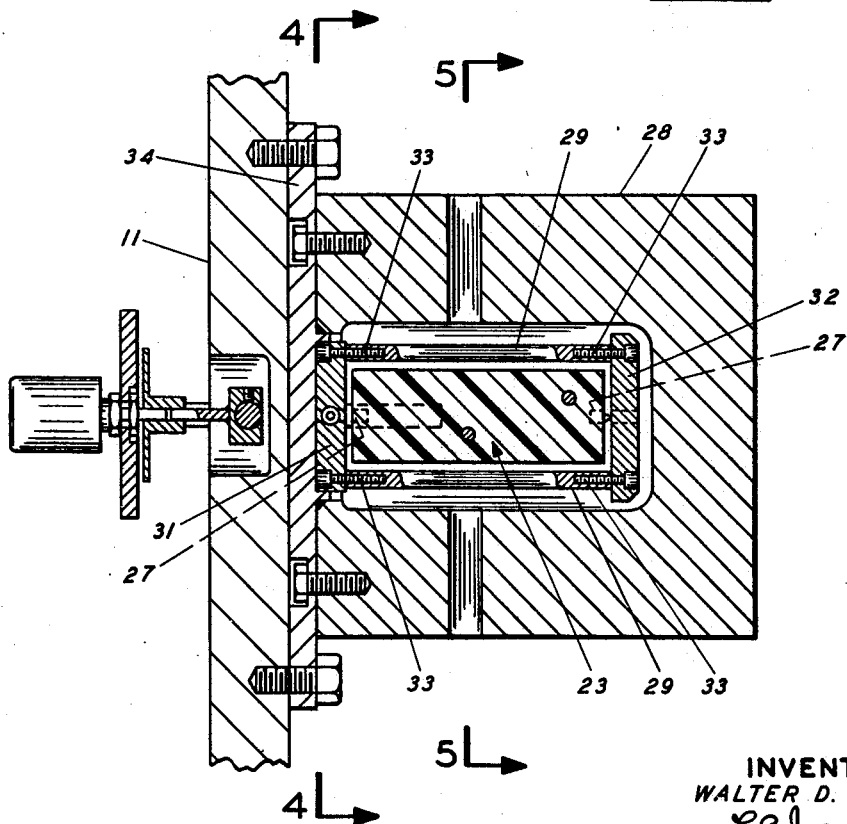
FIGURE 3 is a section taken along line 3—3 of FIG-

URE 2 illustrating the liquid sensing and read-out assembly of the system of FIGURE 2;

FIGURE 4 is a section taken along lines 4—4 of FIGURE 3 illustrating the support means of the liquid sensing assembly of FIGURE 3;

FIGURE 5 is the section taken along lines 5—5 of FIGURE 3 illustrating the liquid sensor of the liquid sensing assembly of FIGURE 3;

FIGURE 6 is a section taken along lines 6—6 of FIGURE 1 illustrating the visual display means of the read-out assembly of FIGURE 3;

FIGURE 7 illustrates a second embodiment of the liquid level system control system of the present invention;

FIGURE 8 is a plan section taken along line 8—8 of FIGURE 7 illustrating, in detail, a modified liquid sensing assembly and a read-out assembly of the present invention;

FIGURES 9 and 10 are sections taken along the lines 9—9 and 10—10, respectively, of FIGURE 7 illustrating the liquid sensing assembly of FIGURE 7; and FIGURES 11 and 12 are sections taken along lines 11—11 and 12—12 of FIGURE 7, respectively, illustrating the read-out assembly of FIGURE 7.

Referring now to the figures, particularly FIGURE 1, there is illustrated in partial section and diagrammatic form, a vessel 10 having a side wall 11. Connected to vessel 10, by way of pipe 12, is a hydrocarbon feedstock separated within vessel 10, into liquid and gas phases by gravity. The surface of the separated liquid phase is indicated at 16. The vessel is also provided with gas exit pipe 13 and liquid exit pipe 14 for conveying the separated gas and liquid streams from the vessel. As it is desirable to maintain the surface 16 of the liquid within a rather closely controlled range of levels within the vessel, liquid level control system 20 of the present invention is connected to a pneumatic valve 15 positioned to control liquid flow from the vessel. Valve 15 responds, as explained below, to pneumatic signals from control circuit 22 to vary flow within pipe 14 as deviations in liquid level are detected within the vessel by liquid level sensing system 21.

As shown in FIGURE 2, sensing assembly 21 includes an elongated sensor member 23 composed of coextensive elements 24 and 25 formed of caustic-resistant, fluid-impervious materials. Elements 24 and 25 are secured along their broad surfaces 26, as shown. The element 25 is provided, at its ends, with jewelled watch pivots 27 so as to rotationally secure the sensor relative to nonmagnetic housing 28. Rotation of sensor 23 is about an elevationally fixed pivot axis A that intersects both of the watch pivots 27, and corresponds, in direction and extent, to the direction and extent of the deviation of the liquid level from an established set-point level for the system.

FIGURE 5 illustrates the dependence of angular rotation of the sensor 23 with changes in liquid level relative to the set-point level of the assembly. In the embodiment shown in FIGURE 5, the set-point level may be established along any horizontal plane which intersects the sensor 23, as along plane B—B midway between rods 29 in coincident alignment with the pivot axis A.

The sensor positioned as shown in FIGURE 5 indicates that the liquid within housing 28, entering by way of radial openings 28a, has established a level coincident with the set-point level of the system. This means the static loads (gravitational and buoyant forces) acting on the sensor have become equalized with respect to the pivot axis. Since the buoyant forces acting on elements 24 and 25 are unequal (the submerged volume of element 25 is larger than that of element 24), they have been balanced by the weight of elements 24 and 25 acting through their respective centroids.

In accordance with the present invention, the change in the magnitude of the differential buoyant force, i.e., the difference in the buoyant forces acting through elements 24 and 25, is used to indicate degree and direction of changes in liquid level relative to set-point level B—B of the system. With reference to FIGURE 5, any "fall" of the liquid surface below the set-point level B—B is seen to produce a proportionate reduction in the magnitude of the differential buoyant force acting on the sensor. Element 25 is designed to be heavier than element 24 although formed of a material having a lower specific gravity. So, as the differential buoyant force is reduced, the larger differential gravitational force acting through element 25, causes clockwise rotation of the sensor as viewed in FIGURE 5. If the liquid level is above the established set-point level, however, the "rise" in liquid level produces an increase in the differential buoyant force acting through element 25. The sensor rotates in a counterclockwise direction as viewed. The rotation in either opposed angular direction ceases when the static loading on the sensor is again equalized.

The extent of rotation of the sensor is a function of both (1) the magnitudes of the differential gravitational forces and the differential buoyant forces acting on the sensor as well as (2) the distances of the line of action of these forces from the pivot axis. By careful selection of the size and materials comprising the elements 24 and 25, the sensor in accordance with the present invention, provides 1:1 correlation between the extent of its rotation and the extent of deviation of the liquid level from the established set-point level of the system. It should be noted that the differential buoyant force must act through element 25 since the submerged volume of that element, upon which the magnitude of differential buoyant force depends, is always larger than element 24. Operation of the sensor in this manner not only reduces the over-all size of the sensor to a minimum, but also increases sensitivity since sensitivity is inversely related to the size of the sensor.

Materials suitable for fabrication of the elements 24 and 25 need not be buoyant to allow the sensor to function as a liquid level detector. Such materials, however, should be (1) chemically compatible with the fluids being monitored, (2) able to withstand pressures within the vessel without changing shape or density, and (3) be nonabsorbers of the fluids being monitored. Examples of suitable materials include:

Element 24:
   Nonmagnetic stainless steel
   Inconel

Element 25:
   Teflon
   Tantalum

Where the sensor is used in severe applications, i.e., high corrosion, high pressure, high temperature, etc., element 25 is preferably formed of Teflon and element 24 formed of nonmagnetic stainless steel. In less severe applications, element 25 may be formed of more common (and cheaper) nonporous plastics material such polypropylene and polyethylene.

FIGURE 3 illustrates the attachment of sensor 23 relative to housing 28. As previously mentioned, the sensor 23 includes watch pivots 27 at its ends. As shown, the pivots 27 are fitted between pairs of cantilevered end plates 31 and 32. End plate 32 is attached to end plate 31 through stop rods 29. Machine screws 33 are used to secure the rods 29 to the plates 31 and 32. End plate 31 is, in turn, attached to curved header flange 34 of the housing 28 as by machine screws as shown.

As shown in FIGURE 4, end plate 31 is also provided with notched sections 31a. The notches allow the placement of the ends of magnets 36 at the near ends of elements 24 and 25 adjacent to the side wall 11; the notches, accordingly, must be appropriately dimensioned so as to not interfere with the movement of the magnets 36 as the sensor rotates in response to a change in liquid level within the vessel.

Exterior control circuit 22 of FIGURE 1 indicates the extent and direction of the changes in liquid level relative to the set-point level of the system by monitoring the change in spatial location of the magnetic lines of force generated by magnets 36 as the sensor rotates. As shown in FIGURE 2, the control circuit 22 includes magnetic follower assembly 41 attached to the exterior surface of side wall 11 by support fixture 42. Magnetic follower 41 includes follower magnet 43 and a magnet holder 43a coupled to a capacitance converter 45 by a central shaft 44.

Preferably, converter 45 is provided with a housing 45a into which a portion of shaft 44 extends where a series of metallic fans (not shown) are attached to the shaft. The fans are adapted to be electrically connected to and form a part of a complementary bridge circuit within capacitance controller 46 of FIGURE 1. As the shaft 44 rotates, these fans are brought into or away from alignment so as to cause a change in capacitance within the bridge circuit in proportion to both the direction and extent of angular rotation of the sensor. An electrical signal generated by the controller is used to control pneumatic controller 47 of FIGURE 1 for applying a correcting signal to pneumatic valve 15. Support fixture 42 is also provided with a central plate 48 having an opening through which shaft 44 extends.

Adjacent to where the shaft 44 contacts the plate 48 is an indicating wheel 51 having an indicator scale visible to the operator. This scale can be graduated into a "black-white" color index, as shown, having a line of intersection calibrated, in azimuth, relative to shaft 44 to indicate a liquid level coincident with the set-point level within the vessel. Rotation of the wheel 51, after calibration, indicates the relative extent and direction of deviations in liquid level from the set-point level.

FIGURE 6 illustrates the exterior visual display of the indicating wheel 51. As shown, central plate 48 of support 42 includes a notched portion 53 through which the operator can see the color index provided on indicating wheel 51. After the indicating wheel 51 is correctly calibrated with respect to shaft 44, deviations in liquid level from the set-point level of the system are indicated by the change in scale visible to the operator through notch 53.

FIGURES 7 and 8 illustrate a second embodiment of the liquid level sensing system of the present invention. In this embodiment, the sensing assembly 21' has been modified to provide a sensor 23' which angularly rotates about pivot axis C, see FIGURE 8, that has been rotated ninety degrees from the pivot axis of the sensor of FIGURES 2-6. The pivot axis C of the new embodiment, however, remains parallel to the surface of the liquid to be monitored. As shown in FIGURE 7, elements 24' and 25' constituting sensor 23' are not vertically coextensive along their axes but are aligned in an end-to-end relationship along vertical end surfaces 60. Their axes of symmetry, however, are coincident and parallel to the surface of the liquid to be monitored. Sandwiched between the mating surfaces 60 of the elements is thin metallic strip 61 preferably formed of foil material. Strip 61 has central openings, through which machine screws 62 extend securing the sensor relative to clamping plates 63, see FIGURE 9. Over the central region of the sensor, a notch 64 is provided so as to locate pivot axis C in horizontal alignment with the axis of symmetry of the sensor.

The diagnostic ability of the sensor is dependent both upon the direction and extent of angular rotation about the pivot axis C. Assume the liquid surface is coincident with the set-point level D as illustrated in FIGURE 7. This is achieved by balancing the weight of elements 24' and 25' (including magnet 65) with the buoyant fluid forces acting on the sensor. When the liquid surface falls below the set-point level for the system, the differential buoyant force of the system is reduced, as previously described. Inasmuch as the element 25' is adapted, by size and material selection, to be heavier than element 24', the sensor rotates in a counterclockwise direction as viewed in FIGURE 7. The differential buoyant force acting on elements 24' and 25' always acts through element 25' inasmuch as its submerged volume is always greater than that of element 24' irrespective of the angular position of the sensor. Contrariwise, as the liquid level rises above the established set-point level, the increased differential buoyant force at elements 25' causes rotation of the sensor in a clockwise direction as viewed in FIGURE 7. It is thus seen that the selected mode of operation of the sensor resembles that of a "seesaw" in which the direction and extent of sensor rotation indicates the direction and extent of the deviation of liquid level relative to its set-point level.

Materials useful in the fabrication of elements 24' and 25' need not be buoyant to allow the sensor to function as a liquid level detector but should be compatible with the fluids and process conditions prevalent within the vessel whose liquid level is being monitored. In addition to the materials previously described, it should also be noted that the elements 24' and 25' may be in the form of noncollapsible shells filled with incompressable liquids having specific gravities compatible with the functioning of the sensor as previously described. For example, element 24' may be adapted to receive mercury within a hollowed-out portion thereof and element 25' may be adapted to receive a lighter incompressable liquid such as gasoline, without departing from the scope of the present invention.

To support the sensor at a predetermined elevational level within a vessel as shown in FIGURE 7, the clamping plates 63 attached to metallic strip 61 are attached to the side wall 11 of the vessel by a cantilevered support that includes horizontal arm 66 and angular ring 67 attached to curved base 68 of the nonmagnetic housing 69. As shown in FIGURE 10, angular ring 67 is attached to the base 68 by a series of machine screws 70.

Changes in liquid level are detected exterior of the vessel by monitoring the change in spatial location of the magnetic lines of force of the interior magnet 65 as the sensor 23' rotates. For this purpose, as shown in FIGURE 7, a magnetic follower 80 is provided exterior of the vessel which includes magnet 81 adapted to cause angular rotation of a balance 82 to which it is attached. Balance 82 is similar to the sensor 23' interior of the vessel, and includes elements 83a and 83b placed in an end-to-end relationship. Elements 83a and 83b are suspended from a fixed cantilevered support 84 attached to the side wall 11 by means of metallic strip 85. As shown, cantilevered support 84 includes a cylindrical hub 87 having a base 86 attached to the side wall 11 and a more remote clamping section 88 attached to metallic strip 85. The support 84 is sealed from the effects of external forces by a housing 89 concentrically attached to the hub 87 as shown in FIGURE 11. Preferably the magnetic follower 80 (except for magnet 81) and the housing 89 (except for Plexiglas end wall 90) are formed of nonmagnetic metals such as stainless steel.

FIGURE 12 illustrates the operation of magnetic follower 80. As liquid within the vessel deviates from the set-point level, the angular rotation of the interior sensor 23' is indicated by balance 82 which rotates relative to its central axis F. As balance 82 rotates, element 83a is seen to angularly rotate relative to base plate 91 and metallic side panels 92. The base plate 91 and side panels 92 are electrically connected (via rod 93 and conductor 94) to a complementary bridge circuit within a capacitance controller, such as controller 46 of FIGURE 1. As rotation of the balance 82 occurs, the metallic element 83a is brought into or away from alignment with plate 91 and panels 92 so as to cause a change in capacitance level within the controller. The controller, in turn, generates a controlled function signal for controlling other process equipment such as the control valve 15 of FIGURE 1.

I claim:

1. A system for maintaining liquid level at a predetermined horizontal set-point level within a vessel comprising:
(a) housing means attachable to said vessel,
(b) sensing means rotatably attached to said housing means having a central axis of rotation fixed, in elevation, with respect to said housing means, said sensing means adapted to provide direction-responsive angular rotation with respect to said axis in at least one of two opposed angular directions as a deviation in liquid level with respect to said set-point liquid level occurs,
(c) sensing means exterior of said vessel for sensing both said one direction of said angular rotation about said central axis of rotation and its extent with respect to a set-point angular position, and
(d) control means in operative contact with said sensing means for varying the flow rate of said monitored liquid relative to said vessel so as to return said liquid level to said set-point level as said deviations occur.

2. Apparatus in accordance with claim 1 in which said sensing means includes attached first and second elements formed of different sizes and of materials of different specific gravities.

3. The apparatus in accordance with claim 2 in which said first element is larger and heavier than said second element.

4. The apparatus in accordance with claim 3 in which said larger and heavier first element is formed of a material having a lower specific gravity than that of said second element.

5. Apparatus in accordance with claim 3 in which said first element is attachable to first magnet means at its end adjacent to a nonmagnetic wall of said vessel, said first magnet means adapted to provide magnetic lines of force penetrable of said vessel to said sensing means exterior of said vessel.

6. Apparatus in accordance with claim 5 in which said sensing means exterior of said vessel includes second magnetic means responsive to spatial changes in said magnetic lines of force of said first magnet means, and capacitance-varying means operatively connected to said second magnetic means adapted to provide an electrical capacitance characteristic varying in accordance with direction and extent of rotation of said second magnet means.

7. The apparatus in accordance with claim 2 in which said attached first and second elements are coextensive with one another having broad mating surfaces substantially parallel to said liquid surface to be monitored.

8. The apparatus in accordance with claim 2 in which said attached first and second elements are juxtapositioned having mating end surfaces attachable in an end-to-end relationship, and supporting means attachable between said mating surfaces of said elements and said housing means so as to define said central axis of rotation.

9. Apparatus in accordance with claim 8 in which said support means includes cantilevered frame means attachable to said housing means and foil means extending between said cantilevered frame and said mating end surfaces of said first and second elements.

10. The apparatus in accordance with claim 2 in which said sensing means is adapted to establish a nonrotational set-point operating condition when said housing means is attached in operative contact to said vessel whereby said liquid level is coincident with said set-point liquid level of said vessel and thereafter to establish a new angular set-point condition as a deviation in liquid level from said liquid set-point level occurs within said vessel, said angular rotation of said sensing means having an angular direction in said one direction and an extent dependent upon the direction and extent, respectively, of a deviation of liquid level from said liquid set-point level within said vessel.

11. The apparatus in accordance with claim 10 in which said new angular set-point condition occurs when gravitational forces of said sensor again balance buoyancy forces acting on said sensor.

12. The apparatus in accordance with claim 2 in which said materials are corrosion-resistant, have specific gravities greater than one and are relatively impervious to fluids.

13. Apparatus for sensing deviations in liquid level within a vessel relative to a set-point elevational level parallel to the surface of the liquid to be monitored, comprising:
(a) housing means attachable to said vessel,
(b) sensing means rotatably attached to said housing means having a central axis of rotation fixed, in elevation, with respect to said housing means, said sensing means adapted to provide direction-responsive angular rotation with respect to said axis in at least one of two opposed angular directions as a deviation occurs in liquid level with respect to said set-point liquid level, and
(c) sensing means exterior of said vessel for sensing both said one direction of rotation about said central axis of rotation and its extent with respect to a set-point angular position corresponding to a liquid level coincident with said elevational set-point level.

References Cited

UNITED STATES PATENTS

| 2,757,326 | 7/1956 | Boundy | 137—412 X |
| 2,953,147 | 9/1960 | Hornback | 137—412 X |
| 3,067,766 | 12/1962 | Connell | 137—412 |

WILLIAM F. O'DEA, Primary Examiner

D. R. MATTHEWS, Assistant Examiner

U.S. Cl. X.R.

73—304, 322.5; 324—61